COUPLER ASSEMBLY

Original Filed Dec. 9, 1963 2 Sheets-Sheet 1

INVENTOR.
BIDWELL CHAPMAN CRANAGE

BY Cohn and Powell

ATTORNEY.

INVENTOR.
BIDWELL CHAPMAN CRANAGE
BY Cohn and Powell
ATTORNEY.

United States Patent

Re. 28,334
Reissued Feb. 11, 1975

28,334
COUPLER ASSEMBLY

Bidwell C. Cranage, Ferguson, Mo., assignor to Chemetron Corporation, Chicago, Ill.

Original No. 3,448,760, dated June 10, 1969, Ser. No. 556,173, June 8, 1966, which is a division of abandoned application Ser. No. 329,319, Dec. 9, 1963. Application for reissue Nov. 16, 1973, Ser. No. 416,713

Int. Cl. F16l 5/02, 33/00, 37/08

U.S. Cl. 137—360 2 Claims

Matter enclosed in heavy brackets [ ] appears in the original patent but forms no part of this reissue specification; matter printed in italics indicates the additions made by reissue.

ABSTRACT OF THE DISCLOSURE

A coupler assembly for a station for a designated fluid which includes a valve plug receiving means having a forward head portion, and a cover plate for the station having an opening communicating with the plug-receiving means, the cover plate having a fluid designation conforming to that of the station. A bracket is secured to one side of the cover plate, the bracket including spaced flanges extending from the cover plate. Either a key or slot is located in a predetermined position on one bracket flange depending on the fluid designation on the cover plate, the key or slot interfitting respectively a coacting slot or key located in a predetermined position on the head portion, the predetermined positions of the coacting key and slot being different for each fluid. The head portion is located between the flanges to align the plug-receiving means wtih the cover plate opening when the coacting key and slot of a compatible bracket and head portion for a particular designated fluid are interfitted. The interfitted key and slot assure that the cover plate having the correct fluid designation will be mounted to the station for that designated fluid.

This is a division of application Ser. No. 329,319, filed Dec. 9, 1963, *now abandoned.*

This invention relates generally to a coupler assembly, and has specific reference to an improved quick detachable coupler having a socket assembly adapted for wall mounting as a flush-type station.

The apparatus of the present invention has application and service in hospitals and laboratories or wherever it is desired to provide one or more conveniently located stations for fluid and suction lines. Wall stations for oxygen, nitrous oxide and vacuum, for example, are standard equipment in modern hospitals.

It is an important object of the present invention to provide improved wall assembly and coupling means whereby a hose may be quickly and simply plugged into a convenient fluid station disposed in the building wall, and with equal facility unplugged therefrom.

An important object is directed to the provision of means which may be operated in an extremely simple manner to attach or detach the hose. The object is achieved by the provision of an improved coupling assembly whereby an operative connection is made by the simple expedient of inserting a plug means on the hose adaptor into the wall receptacle, and release is accomplished by depressing a latch arm accessible closely adjacent the hose adaptor. All that is required in both instances is a simple one-hand manipulation.

Other objects are directed to improved constructional provisions that greatly facilitate the work of installing a flush front station in a wall. This object is achieved by the provision of an assembly which may be installed with the piping in the wall, and which includes a socket member adjustable to permit its forward end to be set in a predetermined position with respect to the surface of such wall. Usually such position is substantially flush with the wall surface. The present construction enables any irregularities in the mounting of the station assembly to be compensated for by simple adjustment of the socket member.

Yet another object is directed to improved constructional provisions that function automatically to close off the fluid supply at the outlet station when the socket member is removed for the purpose of replacing sealing gaskets or other elements which receive wear in use.

An important objective is achieved by constructing the valve mechanism to provide a primary valve means in the socket member that is actuated by a tubular plug, and a secondary valve means including a port behind the primary valve means, and a resilient means interconnecting the primary valve means and the secondary valve means tending to hold the secondary valve means open.

Other important advantages are realized by making the socket member longitudinally adjustable on the base member to permit the forward end of the socket member to be located at a predetermined position, the resilient means interconnecting the primary valve means and the secondary valve means tending to close the primary valve means and to open the secondary valve means regardless of the longitudinally adjusted position of the socket member.

Still another important object is realized by the provision of a structure that interconnects the head portion of the valve-plug-receiving means to the cover plate for the station, the structure including compatible interconnecting key means to assure that the cover palte having the correct fluid designation will be mounted to the valve body for such fluid. Other advantages are realized wherein the above structure comprises a bracket secured to the cover plate which mounts the head portion of the valve body, the bracket and head portion having the compatible interconnecting key means.

It is important that the bracket be secured to and carried by the cover plate in order that it may be considered as a unit for mounting with the valve means. This structural arrangement assures that the bracket having the appropriately located key means is always attached directly to the cover plate having the fluid designation corresponding to the location of such key means, and eliminates the possibility of attaching a cover plate having the incorrect fluid designation to the bracket.

Yet another important objective is realized in that the key means includes a key or slot located in a predetermined position on the bracket depending on the fluid designation on the cover plate, the key or slot interfitting respectively a coacting slot or key located in a predetermined position on the head portion of the valve body, the predetermined positions of the coacting keys and slots being different for each fluid.

Another important objective is realized by the provision of a latching device carried by the bracket that is secured to the cover plate as described previously so that such elements can be considered as a unit for attachment to the appropriate valve means. When replacement of the latch device is required, a completely new unit is substituted, thereby assuring that a cover plate with the correct fluid designation and a bracket having the correct keying means is utilized.

Another important objective is realized by the structural arrangement of the latch arm and its mounting on the bracket so that the latch arm will effectively lock the latch plug of a hose adaptor, yet is capable of being readily detached.

These and other objects and advantages will be more fully described in the following description seting forth a practical embodiment of the invention.

Figure 1:
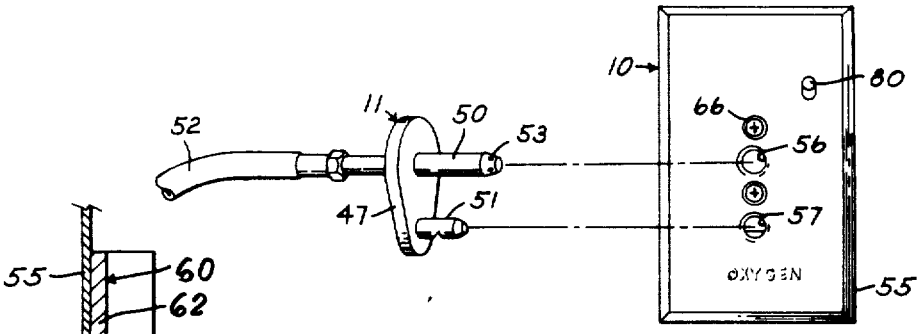
FIG. 1 is a perspective view of the hose adaptor and a front elevational view of the flush type station.

Referring now by characters of reference to the drawings, the coupler assembly consists of the station generally indicated at 10, and a hose adaptor referred to at 11, as indicated in FIG. 1.

The station 10 includes a valve body 12 consisting of a rear body part 13 and a forward body part 14 interconnected by threads 15. The forward valve body part 14 is provided with a longitudinal bore 16 that is open at its outer end. The inner end of the forward body part 14 includes a partition 17 in which there is provided a valve port 20. The rear body part 13 is provided with a chamber 21 that communicates at its forward end with the bore 16 through the valve port 20 and which is closed at its rear end by wall 22.

An extensible, tubular socket member 23 is received in longitudinal bore 16, and is carried by the forward body part 14. The socket member 23 includes an inner portion 24 slightly spaced from the wall defining bore 16, a threaded portion 25 threadedly engaging the forward valve part 14, and a flanged outer head portion 26. An O-ring 27 carried internally of forward body part 14 within the bore 16 engages the inner portion 24 of the socket member 23 to provide a seal.

After the valve body 12 is mounted in place, the socket member 23 is threadedly, longitudinally adjusted in bore 16 so as to dispose the forward head portion 26 at a predetermined position with respect to the outer surface of the wall in which the station is located. Usually such position is in substantial alignment with the wall surface in order to realize a flush wall fixture. Any irregularities in the mounting of a receptable in the wall and in the mounting of the valve body 12 in such receptacle can be compensated for by a simple longitudinal adjustment of socket member 23.

A secondary valve means is utilized to place a supply pipe 30 selectively in communication with the bore 16 of the forward valve body part 14. Specifically, the supply pipe 30 is placed in communication with the chamber 21 of the rear body part 13 through a side opening 31 formed in the rear body part 13 between the valve port 20 and the rear wall 22. A secondary valve element 32, provided by a ball, is located within the chamber 21 and is adapted selectively to regulate flow through the valve port 20. A compression spring 33 constituting a resilient means is located within the chamber 21 behind the secondary valve element 32, one end of the spring 33 engaging the valve element 32 and the opposite end engaging the rear wall 22. The spring 33 tends to urge the secondary valve element 32 forwardly in a direction to close the valve port 20.

The socket member 23 is provided with a longitudinal passage 34 having a reduced forward end portion 35. A primary valve element 36 is slidably carried by socket member 23 in passage portion 35. The primary valve element 36 consists of a reduced front portion 37 that closely interfits passage portion 35, and an enlarged rear portion that closely interfits the larger rear portion of passage 34.

The rear portion of the primary valve element 36 is recessed to receive and seat one end of a compression spring 41, the other end of the spring 41 abutting the secondary valve element 32. It will be importantly noted that the spring 41 is located internally of the socket member 23 and in the bore 16, the spring 41 extending through the secondary valve port 20 and tending to urge the primary and secondary valve elments 36 and 32 apart.

A valve seat or shoulder 42 is located in passage 34 and is adapted to abut a shoulder 43 interconnecting the reduced front portion 37 and the rear portion of primary valve element 36. A plurality of openings 44 are formed laterally in the forward portion 37 of the primary valve element 36, the openings 44 placing the portion of passage 34 ahead of the front valve portion 37 in communication with the portion of passage 34 behind the primary valve element 36, when shoulders 42 and 43 are separated.

Figure 2:
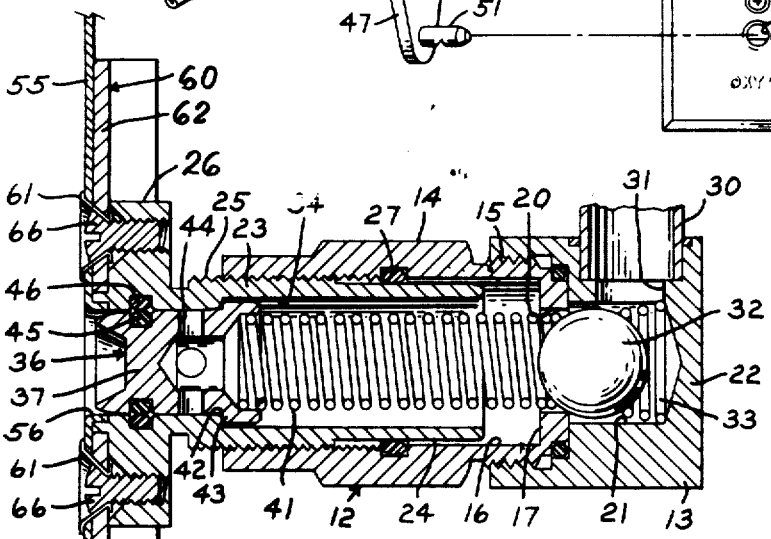
FIG. 2 is a cross-sectional view of the coupler station, showing the parts in normal inoperative positions, the latching device being omitted for purposes of clarity.

When the coupler assembly is not in use the spring 41 tends to urge the primary valve element 36 forwardly to a closed position as shown in FIG. 2 in which valve shoulder 43 abuts the passage shoulder 42, and in which the front portion 37 of the primary valve element 36 extends to the end of the socket member 23 to provide a dust shield. Elastic O-ring 45 carried by primary valve element 36, and O-ring 46 carried by the end of socket member 23 serve to prevent fluid from passing between the reduced passage portion 35 and the reduced primary valve portion 37.

The hose adaptor 11 consists of a bridge piece 47 which carries a tubular valve plug 50 and a latch plug 51. One end of valve plug 50 is attached to a hose 52 (FIG. 1), while the other end is adapted to be inserted into the passage 34 of socket member 23. The innermost end of valve plug 50 is tapered and is provided with a series of openings 53 communicating with the bore 54 of the plug.

The station includes a cover plate 55 having a valve plug-receiving opening 56 and a latch plug-receiving opening 57 adapted respectively to receive the valve plug 50 and latch plug 51 upon insertion of the adaptor 11.

Figure 8:
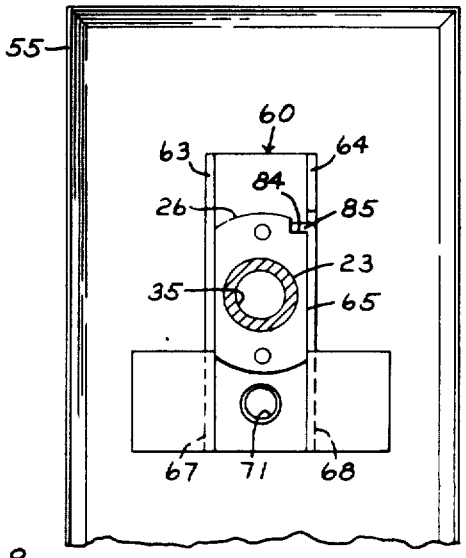
FIG. 8 is a view, partly in cross-section, showing the key means interconnecting the head portion and bracket for a particular fluid such as oxygen.

A bracket generally indicated at 60 is secured to the rear of the cover plate 55 by a pair of hollow rivets 61 passing through the cover plate 55 and the front plate 62 of the bracket. The bracket 60 includes a pair of rearwardly extending side flanges 63 and 64 adapted to receive therebetween the head portion 26 of the socket member 23. As is best seen in FIG. 8, the head portion 26 is provided with flat sides 65 that engage the spaced bracket flanges 63 and 64. The head portion 26 is secured in place by a plurality of screws 66 (FIGS, 2 and 3) extending through the hollow rivets 61.

The latching device is carried by the bracket 60 so that the cover plate 55, bracket 60 and the latching device is considered as a unit for reasons which will be later described in detail.

The latching device includes an elongate rod bent to provide a hinge portion 69 extending between and pivotally mounted in rearwardly extending side flange portions 67 and 68. The latch rod is then reversely bent to provide a latch portion 70 extending substantially parallel with the hinge portion 69 and located immediately behind a latch plug-receiving hole 71 formed in the bracket front plate 62, the hole 71 being aligned directly with the coacting plug-receiving opening 57 formed in the cover plate 55.

It will be noted at this point that the front bracket plate 62 also includes a hole 72 aligned directly with a coacting valve plug-receiving opening 56 formed in the cover plate 55. When the head portion 26 of the socket member 23 is secured in place to the bracket 60, the cover plate opening 56 and the bracket front plate opening 72 are directly aligned with the forward passage portion 35 of the socket member 23.

The lower margins of the side flanges 63 and 64 are provided with notches 73 that receive the latch portion 70. The latch portion 70 includes a cam 74 that is engageable by the latch plug 51 upon insertion of the hose adaptor 11 into the station, the latch plug 51 moving the latch portion 70 downwardly out of its path until the adaptor 11 is fully inserted, at which time the catch abutment 75 of the plug 51 is aligned directly with the latch portion 70. As will be understood, the latch portion 70 is urged upwardly into engagement with the catch abutment 75 to lock the latch plug 51 in place.

The latch rod has a lever portion 76 extending upwardly from the latch portion 70, the lever portion 76 being bent forwardly for projection through a slot 77 formed in the cover plate 55. That portion of the lever 76 extending outwardly through the cover plate 55 constitutes a handle 80 that can be depressed to actuate the latching device to release the latch plug 51.

The resilient means tending normally to hold the latch arm portion 70 up within the bracket notches 73 consists of a torsion spring 81 located between the flange extensions 67 and 68 and about the hinge portion 69. One end 82 of the spring 81 is anchored to the flange extension 67, while the opposite end 83 bears against the underside of the latch portion 70.

A key means is utilized to interconnect the head portion 26 of the tubular socket member 23 with the bracket 60 in order to assure that the cover plate 55 having the correct fluid designation, such as oxygen, is connected to the valve body 12 for such fluid. For example, the head portion 26 (FIG. 8) is provided with a slot or recess 84 located in a predetermined position. The bracket flange 64 is provided with an inturned key 85 at a predetermined location adapted to interfit the key slot 84, thereby allowing the positioning and mounting of the head member 26 in the bracket 60 with the valve plug-receiving openings 56 and 72 aligned with the passage portion 35 of the socket member 23.

If the cover plate 55 had a fluid designation other than oxygen, as for example, a vacuum, the key formed on the bracket 60 would be located in another predetermined position and would not interfit the key slot 84, and would therefore preclude mounting of the bracket 60 onto the head portion 26. Each fluid designation on the cover plate 55 requires a particularly located key adapted to interfit a compatible key slot on the head portion which is located in a predetermined position for such fluid. This key means will, for example, preclude the attachment of a cover plate 55 having a designation other than oxygen onto the valve body 12 which is attached to the oxygen supply pipe.

Figure 7:
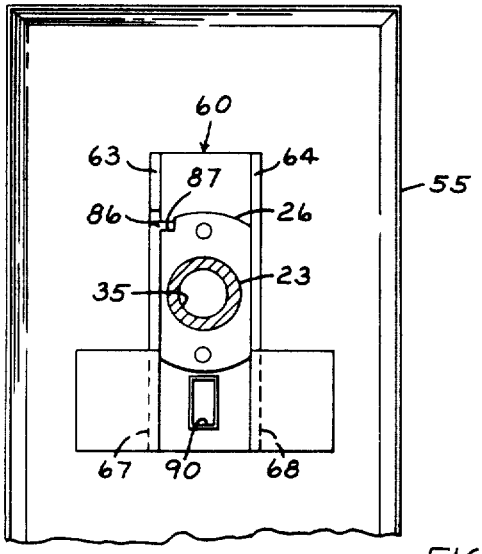
FIG. 7 is a view, partly in cross section, of the key means interconnecting the head portion of the valve body with the bracket in a station for a vacuum.

This feature is emphasized in FIG. 7 wherein the bracket 60 is provided with an inturned key 86 from the side flange 63. The head portion 26 of the valve body 12 is provided with a coacting slot or recess 87 adapted to receive the key 86 upon mounting of the head portion 26 to the bracket 60. The particular bracket 60 having the key 86 is secured to the cover plate 55 that carries a designation of a vacuum. The valve body 12 containing the head portion 26 of FIG. 7 is adapted for a vacuum station.

It will be clear that the bracket 60 of FIG. 7 having a cover plate designation of a vacuum could not be mounted onto the head portion 26 of FIG. 8 in which the valve body is adapted for oxygen. Thus it is seen that the proper installation of cover plates having different fluid designations is assured in that they will be at all times attached to the correct valve bodies for such fluids.

Figure 3:
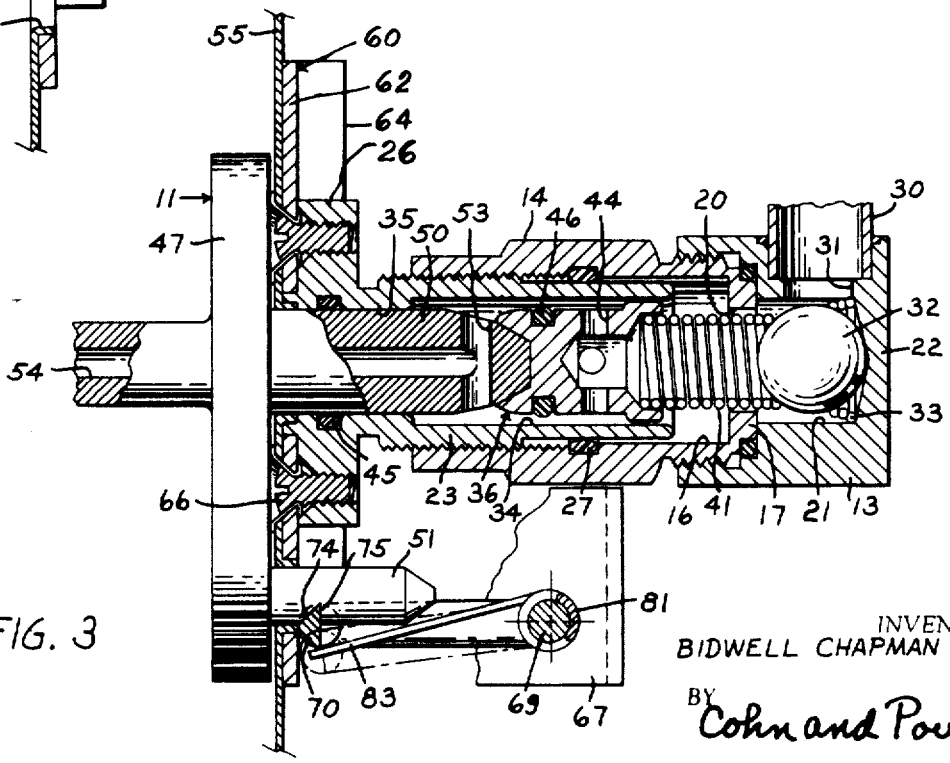
FIG. 3 is a cross-sectional view of the coupler station showing the hose adaptor connected.
Figure 4:
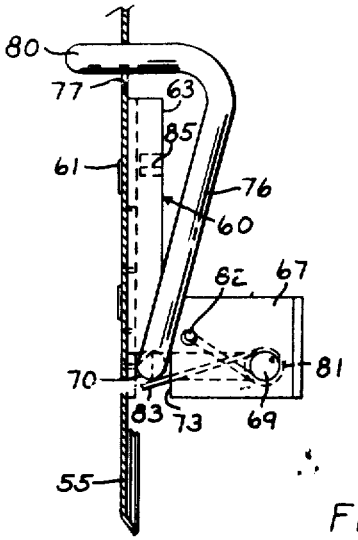
FIG. 4 is a side elevational view of the latch mechanism together with its associated bracket, the cover plate being shown in section.
Figure 5:
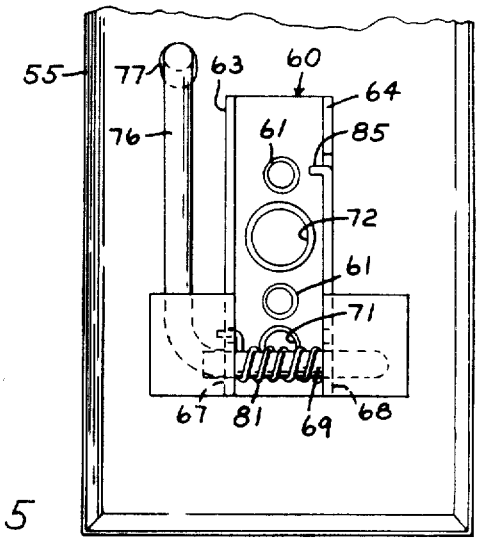
FIG. 5 is a rear elevational view of the unit shown in FIG. 4 as seen from the left of FIG. 4.
Figure 6:
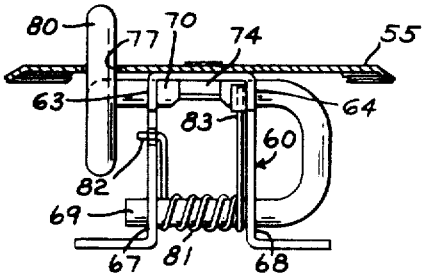
FIG. 6 is a top plan view of the unit shown in FIGS. 4 and 5.

To make sure that a hose adaptor 11 as shown in FIGS. 1 and 3, associated with a fluid such as oxygen, cannot be accidentally or unintentionally attached to a station in which the valve body is adapted for another application such as a vacuum, the cover plate 55 bearing the designation of a vacuum together with its associated bracket 60 is provided with a rectangular opening 90 (FIG. 7), which is adapted to receive closely a correspondingly formed rectangular latch plug (not shown) on the hose adaptor for a suction line. Thus it is seen that a suction line having an adaptor with a rectangularly shaped plug cannot be inserted into an oxygen outlet station because it will not pass through the circular cover plate opening 57 or the circular bracket opening 71. Conversely, an oxygen line, for example, having an adaptor 11 with a circular latch plug 51 cannot be inserted into a vacuum station because such latch plug 51 will not pass through the rectangularly shaped cover plate and bracket opening 90.

It is thought that the installation and operation of the station has become fully apparent from the foregoing detailed description of parts, but for completeness of disclosure such mounting and usage will be briefly described.

First, it will be assumed that the valve body 12 is mounted in the wall and connected to the supply pipe 30 in the conventional manner, and that the socket member 23 is threadedly adjusted longitudinally to bring the head portion 26 flush with the wall surface. It will be further assumed for purposes of illustration that the valve body 12 is to dispense oxygen, in which case, the head portion 26 is provided with a key slot 84 located in a predetermined position as shown in FIG. 8. The cover plate 55, together with its associated bracket 60 and latching device, all considered as a unit, is applied over the head portion 26. The appropriate cover plate 55 bears the fluid designation of oxygen, and the bracket 60 has a suitably located key 85 that interfits the key slot 84 of the head portion 26. Screws 66 are applied through the hollow rivets 61 and threadedly attached to the head portion 26.

When the hose adaptor 11 is detached, the component parts of the valve mechanism assume the positions illustrated in FIG. 2. It will be noted that the spring 41 tends to urge the primary valve element 36 forwardly so that shoulder 43 bears against passage shoulder 42, and that the O-rings 45 and 46 provide a seal. In addition, the spring 41 tends to urge the secondary valve element 32 loading of the weaker spring 33. The spring 41 acts in the above manner regardless of the longitudinal position of the socket member 23.

To connect the hose adaptor 11 to the station 10, the valve plug 50 is inserted into the passage portion 35 of socket member 23, and the latch plug 51 is inserted into the aligned cover plate and bracket openings 57 and 71.

As the valve plug 50 is moved inwardly, the plug 50 depresses the primary valve element 36 rearwardly against the action of spring 41 and against the pressure exerted by the secondary valve element 32. When the valve plug 50 is fully inserted, as is shown in FIG. 3, the forward end 37 of the primary valve element 36 clears the close-fitting reduced passage portion 35 of passage 34, and hence the valve plug 50 is placed in communication with the bore 16. As the spring 41 is compressed upon rearward movement of the primary valve element 36, such spring 41 moves the secondary valve element 32 rearwardly away from the valve port 20 and substantially against the rear wall 22 of chamber 21, thereby opening the valve port 20 fully. It is seen that the supply pipe 30 is now placed in direct communication with the bore 16 through the valve port 20, and hence placed in communication with the valve plug 50.

As the latch plug 51 is moved inwardly it engages the cam 74 of the latch portion 70 and pivots the latch arm about its hinge connection so that the latch portion 70 is moved out of the path of the latch plug 51 until the catch abutment 75 is aligned with the latch portion 70. At which time, the adaptor 11 is fully inserted and the torsion spring 81 operates to urge the latch arm 70 into operative engagement with the catch abutment 75 to preclude withdrawal of the adaptor 11.

To release the hose adaptor 11, the latch handle 80 is depressed to swing the latch portion 70 downwardly away from the catch abutment 75 of the latch plug 51. While the latch handle 80 is held in this depressed position, the adaptor 11 is simply withdrawn from the station 10.

As the valve plug 50 is removed, the spring 41 urges the primary valve element 36 forwardly to its initial position previously described in which the primary valve element shoulder 43 engages the passage shoulder 42 and in which the O-rings 45 and 46 provide an effective seal between the primary valve element 36 and the reduced passage portion 35.

When the latch plug 51 is withdrawn a sufficient distance so that the latch portion 70 is misaligned with the catch abutment 75, the latch handle 80 can be released. Upon complete removal of the latch plug 51, the torsion spring 81 will urge the latch portion 70 upwardly into the bracket notches 73 which determine its effective position aligned immediately behind the cover plate and bracket openings 57 and 71, the latching device being therefore conditioned for subsequent use.

If for some reason it is desired or required to replace an O-ring 45 or 46 or some other component part carried by the tubular socket member 23, the cover plate 55 together with its attached bracket and latching device considered as a unit is detached from the head portion 26 by removal of the screws 66. Then, the socket member 23 can be threadedly detached from the valve body 12. Removed with the socket member will be the primary valve element 36 and the compression spring 41. Upon removal of the spring 41, the other spring 33 will urge the secondary valve element 32 forwardly in the chamber 21 to close the valve port 20, thereby precluding any flow of fluid through the supply pipe 30 and valve body 12 while replacement of such parts is made.

Although the invention has been described by making detailed reference to a preferred embodiment, such detail is to be understood in an instructive, rather than in any restrictive sense, many variants being possible within the scope of the claims hereunto appended.

I claim as my invention:

1. In a coupler assembly:

(a) a station for a designated fluid comprising a valve plug-receiving means having a forward head portion, (b) a cover plate for the station having an opening communicating with the plug receiving means, the cover plate having a fluid designation conforming to that of the station, (c) a bracket secured to one side of the cover plate, the bracket having spaced flanges extending from the cover plate, and (d) a key or slot located in a predetermined position on the bracket depending on the fluid designation on the cover plate, the key or slot interfitting respectively a coacting slot or key located in a predetermined position on the head portion, the predetermined positions of the coacting key and slot being different for each fluid, (1) the head portion being located between the flanges to align the plug-receiving means with the cover plate opening when the coacting key and slot of a compatible bracket and head portion for a particular designated fluid are interfitted, the interfitted key and slot assuring that the cover plate having the correct fluid designation will be mounted to the station for that designated fluid.

2. A coupler assembly as defined above in claim 1, in which:

(e) the valve plug-receiving means comprises a body having a bore, and (f) a tubular socket member is received and rotatively adjustable in the bore and is carried by the body, the socket member receiving the plug and provided with the forward head portion, (g) the spaced bracket flanges between which the head portion closely fits precludes turning of the head portion and hence turning of the socket member, and (h) the head portion is provided with the key slot and one of the bracket flanges has the coacting key that interfits the key slot to mount the head portion to the bracket when the cover plate with the correct fluid designation is applied to the station for that designated fluid.

References Cited

The following references, cited by the Examiner, are of record in the patented file of this patent or the original patent.

UNITED STATES PATENTS

| | | | |
|---|---|---|---|
| 1,425,049 | 8/1922 | Peterson | 339—186 R |
| 2,908,511 | 10/1959 | Rogers | 137—359 X |
| 3,108,825 | 10/1963 | MacDonald | 285—18 |
| 3,194,588 | 7/1965 | Buckey et al. | 285—18 |
| 3,170,667 | 2/1965 | Szohatzky | 251—149.6 |

FOREIGN PATENTS

| | | |
|---|---|---|
| 771,968 | 4/1957 | Great Britain. |

HENRY T. KLINKSIEK, Primary Examiner

U.S. Cl. X.R.

137—614.05; 251—149.6; 285—18

UNITED STATES PATENT OFFICE

CERTIFICATE OF CORRECTION

Patent No. Re. 28,334 Dated 11 February 1975

Inventor(s) Bidwell C. Cranage

It is certified that error appears in the above-identified patent and that said Letters Patent are hereby corrected as shown below:

Column 1, line 6, delete "abandoned";

Column 1, line 7, change "1963. Application" to --1963, which issued as Pat. No. 3,477,105 on Nov. 11, 1969. Application Ser. No. 416,714 for reissue of Pat. No. 3,477,105 was filed on Nov. 16, 1973 and issued as Pat. No. Re. 28,241 on Nov. 12, 1974. Application--;

Column 1, line 42, delete "now abandoned" and substitute therefor --which issued as Pat. No. 3,477,105 on Nov. 11, 1969. Application Ser. No. 416,714 for reissue of Pat. No. 3,477,105 was filed on Nov. 16, 1973 and issued as Pat. No. Re. 28,241 on Nov. 12, 1974--.

Signed and sealed this 15th day of July 1975.

(SEAL)
Attest:

RUTH C. MASON
Attesting Officer

C. MARSHALL DANN
Commissioner of Patents
and Trademarks